United States Patent

Gerard

[15] 3,686,439

[45] Aug. 22, 1972

[54] TELEPHONE-LINE INSTALLATION FOR KEEPING A REMOTE WATCH ON PREMISES

[72] Inventor: Jean Gerard, Neuilly-sur-Seine, France

[73] Assignee: Fichet-Bauche, Suresnes, France

[22] Filed: Aug. 24, 1970

[21] Appl. No.: 66,536

[30] Foreign Application Priority Data

April 28, 1970 France.......................7015512

[52] U.S. Cl...................................................179/5 R

[51] Int. Cl.............................................H04m 11/04

[58] Field of Search..............................179/2 A, 5 R

[56] References Cited

UNITED STATES PATENTS

| | | | |
|---|---|---|---|
| 3,492,426 | 1/1970 | Foreman | 340/112 X |
| 3,582,555 | 6/1971 | Kok | 179/5 R |
| 3,598,917 | 8/1971 | De Raedt | 179/5 R |
| 3,613,092 | 10/1971 | Schumann | 340/413 |
| 3,426,348 | 2/1969 | Sadler | 179/2 A |

*Primary Examiner*—Ralph D. Blakeslee
*Attorney*—Karl F. Ross

[57] ABSTRACT

A plurality of sensors at a transmitting station, responsive to different types of disturbances on premises to be kept under surveillance, generate respective bits of a basic binary word which is modulated onto a low-frequency carrier for communication to a receiving station. At the transmitter, an encoder successively converts the basic word into different bit combinations which are then reconverted at the receiver into the original word for evaluation in a shift register. Upon iterative reception of an abnormal code combination, a counter at the receiving station triggers an alarm distinctively indicating the nature of the disturbance on the basis of the improper bit or bits.

14 Claims, 12 Drawing Figures

JEAN GERARD
INVENTOR:

BY Karl F. Ross
ATTORNEY

Karl F. Ros

Karl F. Ross

Karl J. Ross

Karl F. Ross

JEAN BEAUD
INVENTOR
BY Karl F. Ross
ATTORNEY

TELEPHONE-LINE INSTALLATION FOR KEEPING A REMOTE WATCH ON PREMISES

My present invention relates to a telephone-line installation for keeping a remote watch on premises.

Installations are known which enable a remote surveillance of protected premises from a monitoring station, normally situated in the same building as the premises or room to be surveyed. Placed in the latter is a sensor connected to the monitoring station by a two-wire telephone line, the opening of a circuit by the sensor in response to a specific avent causing the interruption of the normally continuous current which circulates in the telephone line and hence the setting off of the alarm in the monitoring station.

It has been found that such an installation does not always offer the required security because it is relatively easy for burglars to render it ineffective.

The general object of my invention is to provide an installation of this character which offers incomparably greater security and which, in practice, cannot be deactivated inasmuch as any attempt to do so, particularly by tampering with the telephone line, sets off the alarm.

Furthermore, the invention aims at permitting a diversified surveillance whereby different alarms are set off at the monitoring station depending on the type of disturbance occurring on the surveyed premises so that proper corrective action can be taken.

The installation according to the invention comprises, on the premises on which a watch is to be kept, means for applying to the telephone line a binary word, consisting of a succession of digits, which has a given composition when no sensor is actuated but whose composition is modified when an event occurs to which one of the sensors is responsive, and means at the monitoring station for detecting a departure from said given composition of that word and thereupon setting off an alarm.

According to a more particular feature of the invention, the word comprises as many significant digits as there are sensors, means being provided at the monitoring station for giving a distinctive type of alarm depending on which of the several sensors has been actuated.

In the normal or non-alarm condition, the composition of the transmitted binary word may be periodically modified, the monitoring station comprising complementary means for making the reverse modification to restore the original digital configuration.

In that event, each word may comprise at least one non-significant digit which remains unchanged in the course of the periodic modification so that it is possible to ascertain, at the monitoring station, any deterioration in the transmission, particularly a discontinuity in the telephone line.

An installation according to the invention is relatively insensitive to noise frequencies which may circulate in the telephone line.

The invention enables a watch to be kept, over distances of several tens of kilometers, by means of relatively simple equipment on the surveyed premises, the monitoring equipment being likewise of simple construction.

A common central office may combine a multiplicity of monitoring stations connected by telephone lines to a multiplicity of premises which are to be kept under surveillance and which may be distributed over a wide area.

One embodiment of the installation according to the invention is described below by way of example with reference to the accompanying drawing in which.

Figure 1:
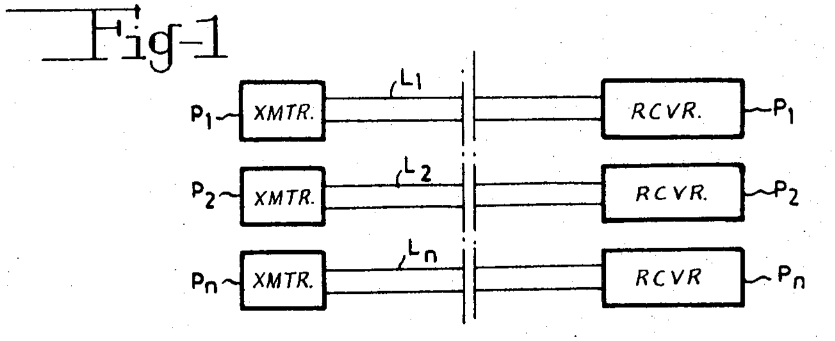
FIG. 1 is an overall block diagram.

The installation comprises, at a monitoring office, the same number of receiving stations $P_1, P_2 \ldots P_n$ (FIG. 1) as there are transmitting stations $p_1, p_2 \ldots p_n$ situated on respective premises on which a watch is to be kept and which are connected to the monitoring office by telephone lines $L_1, L_2 \ldots L_n$, respectively.

Figure 2:
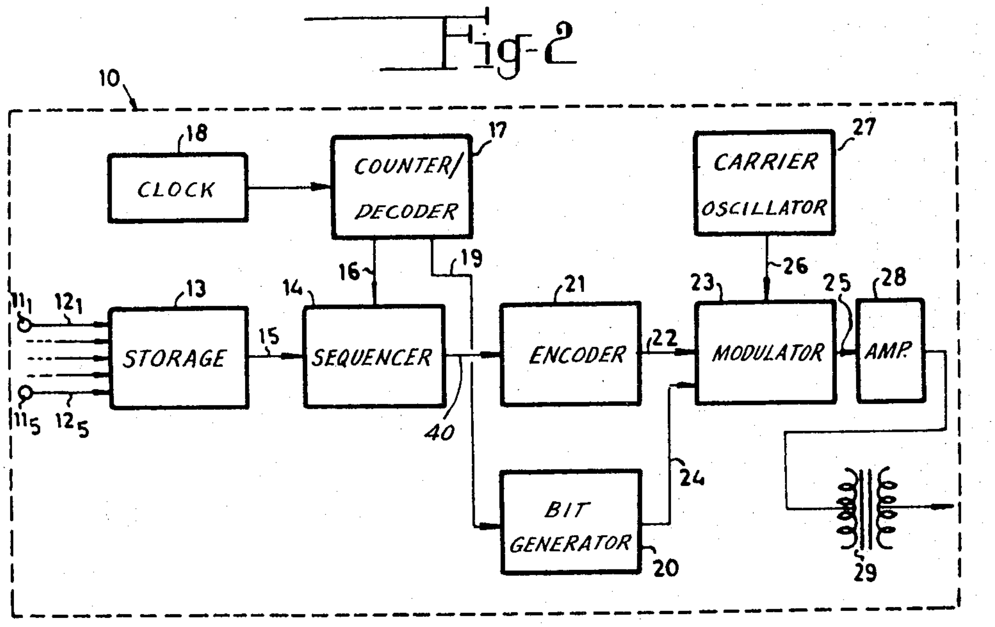
FIG. 2 shows, also in the form of a block diagram, the layout of a transmitter on premises on which a watch is to be kept.

A transmitting station $p$ is equipped with several (here five) sensors $\mathbf{11}_1 - \mathbf{11}_5$ (FIG. 2) each of which is responsive to an event whose existence or absence should set off and alarm; for example, one sensor may detect the breaking of a window pane, another may respond to vibrations occurring on the premises where it is situated, a third may be responsive to light, a fourth to the interruption of a supply of current, a fifth to the temperature. The sensors $\mathbf{11}_1 - \mathbf{11}_5$ are connected, by lines $\mathbf{12}_1 - \mathbf{12}_5$ respectively, to a storage device 13 having a number of input registers equal to that of the sensors. Each of the input registers is empty so long as the sensor corresponding thereto is not excited. As soon as this sensor is in the excited state, even for a very short time, the information representing this excitement is retained by the corresponding register for as long as is necessary.

The storage device 13 is followed by a sequencer 14 which, through an output 16 of a counter-decoder device 17 controlled by an electronic clock 18, is connected successively and periodically, by a channel 15, to the various registers in the device 13. The clock 18 may advantageously have a relatively low frequency, for example 100 cps.

The counter-decoder device 17 introduces equal time intervals $t_1, t_2 \ldots t_5$ into the sequencer 14 giving rise, in its output 40, to respective bits or digits characteristic of the condition of the sensors $\mathbf{11}_1$ to $\mathbf{11}_5$.

For example, it may be the digit "0", that is to say the absence of current at the output 40, which corresponds to the non-excited state of a sensor and the digit "1" which corresponds to the excited state.

A second output 19 of the counter-decoder 17 is connected to a bit generator 20 contributing the invariable first and last digits of a word. In the example described, the beginning-of-word digit, occurring at the moment $t_0$, has the binary value "0". The end-of-word digit, on the other hand, has the value "1", and the disclosed system provides that the duration of the end-of-word pulse should equal two clock cycles, that is to say that it should exist for the times $t_6 - t_7$ and thus consist of two "1" digits.

The output of the sequencer 14 is connected to the input of an encoder 21 serving to subject the successive significant digits of a word to modifications in accordance with a predetermined arbitrary law, which can be modified at will.

Figure 3:
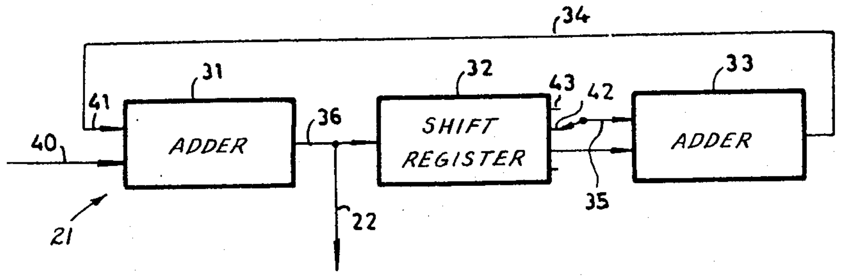
FIG. 3 shows, in block-diagram form, an encoding device in the transmitter.

In the disclosed embodiment, the encoder comprises a first adder circuit 31 (FIG. 3) receiving the output of the sequencer 14 at an input connected to lead 40 and feeding a shift register 32, followed by a second adder 33 whose output 34 is connected in a feedback loop to the second input 41 of the first adder 31. The shift register 32 is operated in a single direction and has two outputs 42, 43 selectively connectable to an input 35 of the second adder 33. The digits supplied to the input 36 of the shift register 32 circulate from left to right with each leading edge of a clock pulse. The output 22 of the first adder is the output of the encoder.

Figure 4:
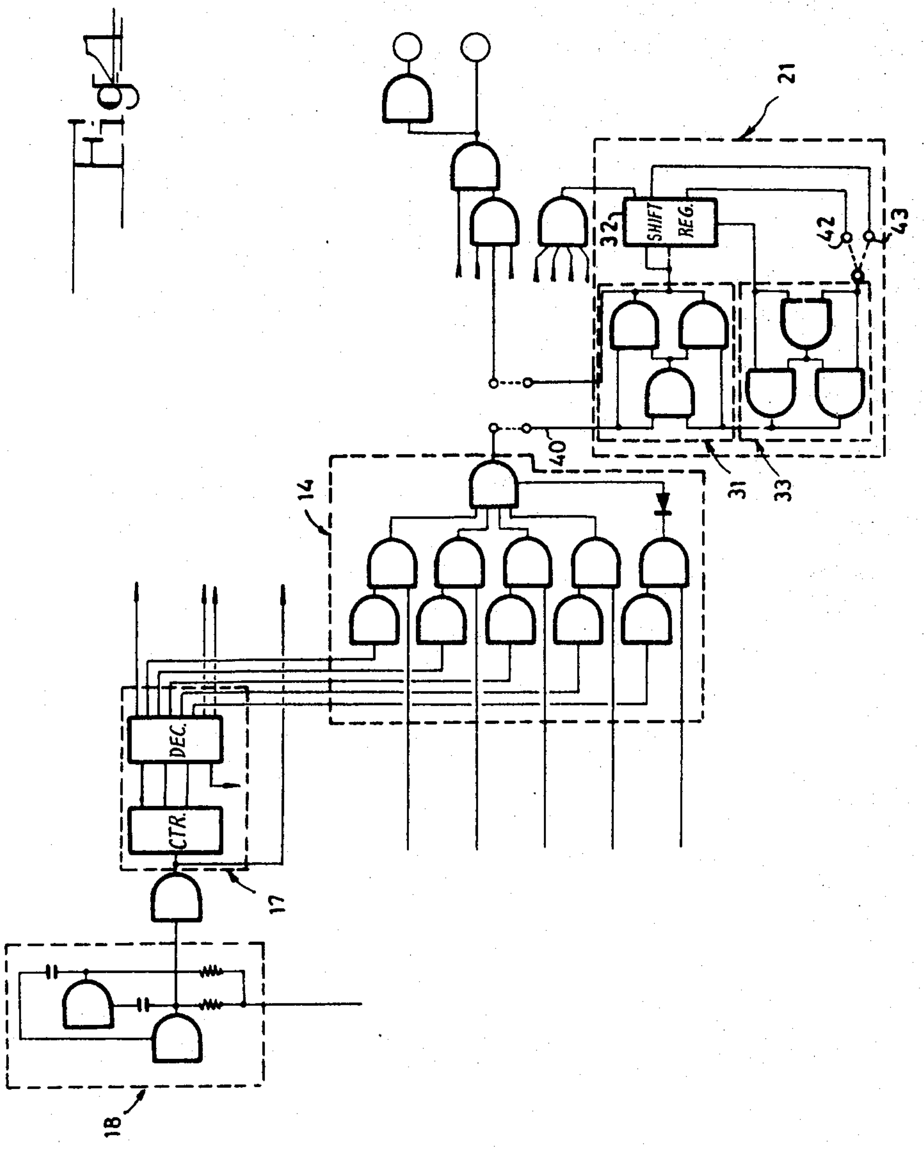
FIG. 4 shows the construction of certain units forming part of the transmitter.

FIG. 4 shows details of the construction of the clock 18, of the counter-decoder 17, of the sequencer 14 and of the encoder 21.

The following table shows, in the first column, an invariable basic or input word "10101" without its initial and terminal digits (which bypass the encoder) and in the second column, by way of example, the words obtained at the output 22 of the encoder 21, different from the input word and all different from one another.

| | |
|---|---|
| 10101 | 10010 |
| 10101 | 10111 |
| 10101 | 01110 |
| 10101 | 00000 |
| 10101 | 01011 |
| 10101 | 11001 |
| 10101 | 00101 |

The words leaving the encoder 21 are fed, over a channel 22, to a modulator 23, for example a diode modulator (FIG. 2), which also receives, over a line 24, the beginning-of-word and end-of-word bits from device 20. The modulator 23 further receives the output 26 of a carrier-oscillation generator 27 whose frequency may be 1,000 cps, for example, corresponding to 10 times the clock-pulse cadence.

The modulator 23 is followed by an amplifier 28 connected to the line by means of a transformer 29.

Figure 5:
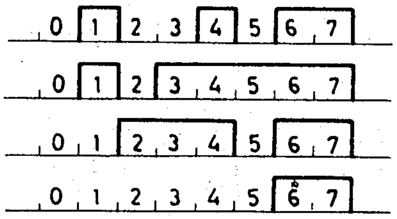
FIG. 5 is a diagram of digits making up several successive modifications of a basic binary word.

The diagram of FIG. 5 shows a series of words whose significant digits, corresponding to the first four lines of the above table, have been supplemented by the beginning-of-word digit "0" and by the end-of-word bit pair which consists of two "1" digits.

Figure 6:
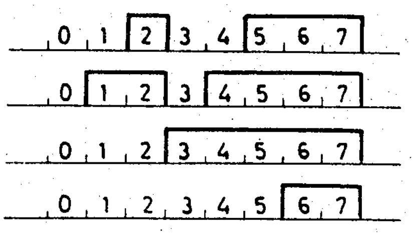
FIG. 6 is a similar diagram showing several further modifications of that word.

The diagram of FIG. 6 is derived from that of FIG. 5 by a shift of one clock cycle.

After a succession of seven words, all different from one another (although they correspond to the same state of the associated sensors), the sequence begins again.

When it is desired to change the code, it is sufficient to switch from output 42 to output 43 of the shift register.

It is possible to introduce a number of codes greater than two.

Figure 8:
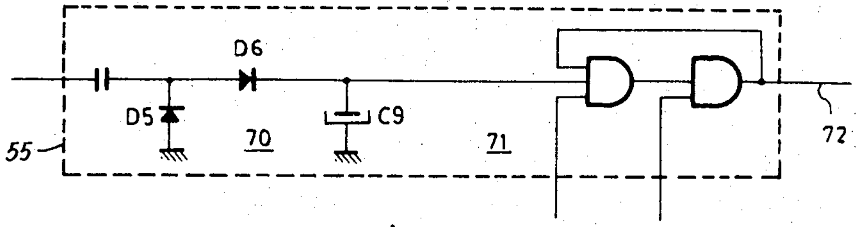
FIG. 8 shows details of the construction of a device forming part of such a receiver.
Figure 7:
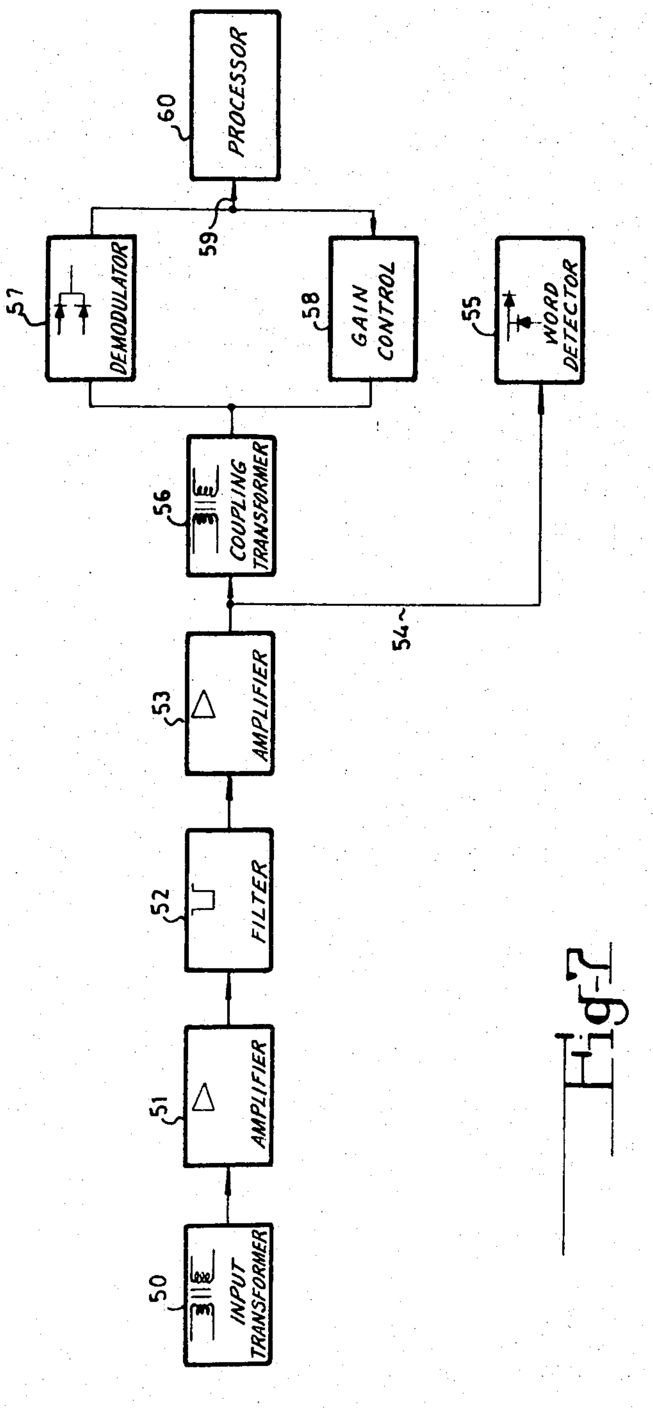
FIG. 7 shows, in block-diagram form, a receiver situated at the monitoring station.

At a receiving station, an input transformer 50 (FIG. 7) energized by the telephone line is followed by a first amplifier 51 which works into a shape-restoring filter 52 whose output is connected to a second amplifier 53. A branch lead 54 from amplifier 53 is connected to a device 55 adapted to check the effective presence, in continuous succession, of the words on the line. The construction of the word detector 55 is given in FIG. 8. It comprises an integrating circuit 70 with two diodes $D_5$ and $D_6$ and a capacitor $C_9$, followed by a threshold detector 71 whose output 72 sets off an alarm when the energy level at the input of stage 71 becomes lower than a predetermined value so as to indicate the absence of the two normally present end-of-word digits $A_6$ and $A_7$. The time constant of the integrator including capacitor $C_9$ is selected so as to be substantially equal to the duration of six successive digits.

The output of the amplifier 53 (FIG. 7) is further connected, by means of a coupling transformer 56, to a demodulator 57 which co-operates with an automatic-gain-control device 58 designed to compensate temporary attenuation of the signals received over the telephone line. The output 59 of the demodulator 57 enters a logical processor 60.

Figure 9:
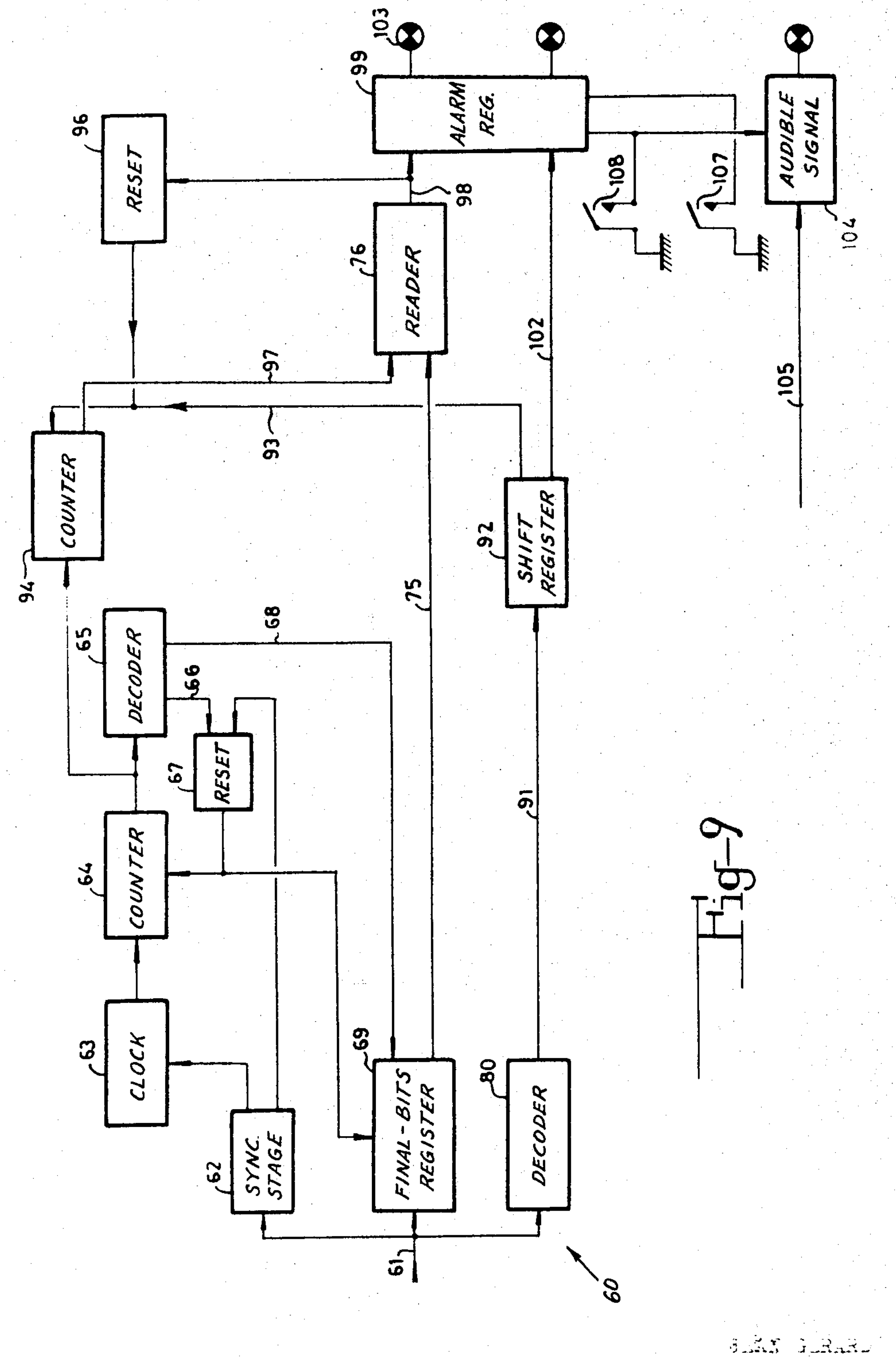
FIG. 9 shows details of the construction of the terminal portion of the receiver.

The input 61 (FIG. 9) of the processor 60 is connected to a synchronization stage 62 adapted to synchronize an electronic clock 63, included in the receiver, on each trailing edge of a square pulse representing a digit "1" of a word. The synchronization therefore takes place at least once per word, namely at the end of the time interval $t_7$.

The clock 63 controls a counter 64, followed by a decoder 65 which, through its output 66, transmits a pulse at every time $t_7$ to a resetting device 67 for the counter 64. The resetting device 67 is controlled by the output of the synchronization stage 62 but becomes effective only at the time $t_7$, as determined by the decoder 65.

A second output 68 of the decoder 65 transmits the times $t_6$ and $t_7$ to a checking register 69 for the two terminal digits $A_6$, $A_7$ connected to the input 61 of the logical processor 60. The output 75 of the register 69 transmits a pulse to a reader 76 only if there exists a "1" digit or bit of unity value at times $t_6$ and $t_7$. This verifies the satisfactory operation of the whole of the communication system including the transmitter, the line and particularly the logical circuitry.

The input 61 is likewise connected to a decoder 80, whose function is the reverse of that of the coder 21 of the transmitter, i.e. the reconversion of the modified words into the original bit combination (10101).

Figure 10:
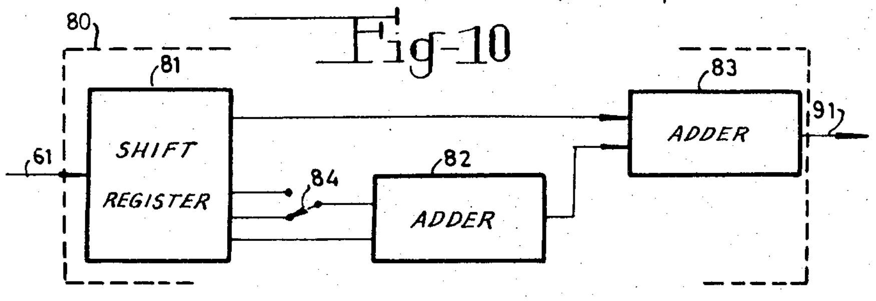
FIG. 10 is a block diagram of a decoder in the receiver.

The construction of the decoder 80 is illustrated diagrammatically in FIG. 10. It comprises a shift register 81, a first adder 82, and a second adder 83.

A switch 84 permits the change of code. It is actuated in conjunction with the switch of the coder of the transmitter to which the receiver is connected by the telephone line.

The decoded word appears at the output 91 of the decoder 80 and is a replica of the word applied to the input of the encoder 21 of the transmitting station.

Figure 11:
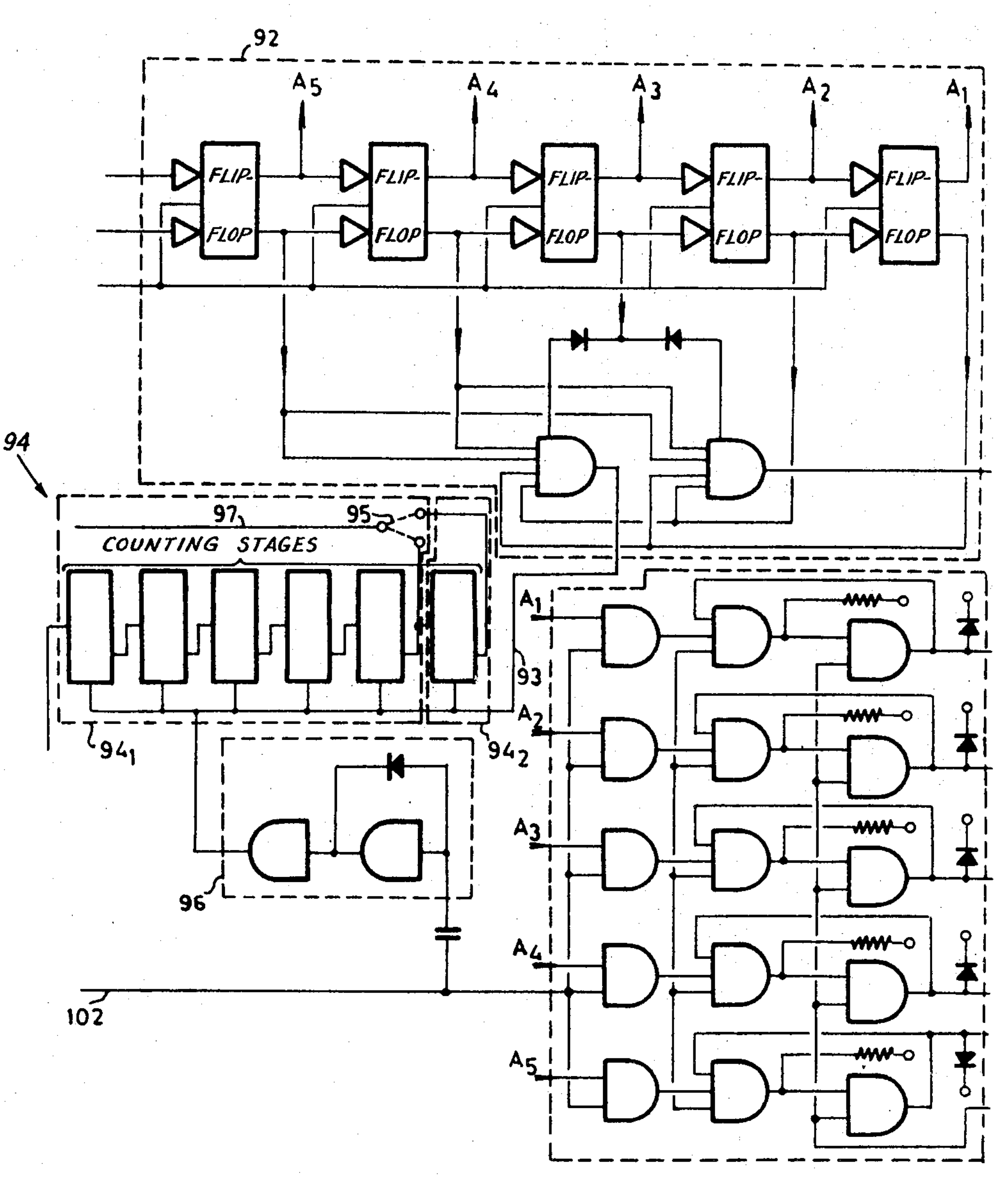
FIG. 11 illustrates output circuits of the receiver.

The output 91 of the decoder 80 applies the serial digits of the successive words to a shift register 92 (FIGS. 9 and 11), shown to comprise five stages in the form of flip-flops with respective outputs carrying bits $A_1$, $A_2$, $A_3$, $A_4$, $A_5$.

The value of the significant digits $A_1$, $A_2$, $A_3$, $A_4$, $A_5$ of a word is continuously transmitted, through an output lead 102, to an alarm register 99.

Another output 93 of the shift register 92 is connected to a sequence-counting device or word counter 94, a sequence being a succession of a given number of words.

In the state of normalcy, the shift register 92 contains a message corresponding to this state and blocks the sequence counter 94. As soon as the shift register 92 finds that a significant digit represents an anomaly in the corresponding sensor it unblocks the sequence counter 94.

In the embodiment illustrated the sequence counter 94 comprises a first counting section $94_1$ (FIG. 11) delivering a pulse at its output after a given number of pulses have been applied to its input, corresponding for example to 16 consecutive words, and a second counting section $94_2$ delivering a pulse at its output when its input has received pulses corresponding to a succession of 32 words. A selector 95 enables a switchover between the outputs of sections $94_1$ and $94_2$ for a count of either sixteen or 32 words.

The output pulse from the sequence counter 94 is applied, via a lead 97 (FIG. 9), to the reader 76 whose output 98 is fed to the input of a resetting device 96 for the sequence counter 94 and likewise to the alarm register 99. The device 96 resets the sequence counter 94 to zero when the word entering the shift register 92 consists of digits indicating a state of non-excitation of all associated sensors.

So long as the succession of digits in a word corresponds to this normal state of nonexcitation, the sequence counter 94 is not started by the shift register 92. If one of the digits of a word does not correspond to the state of normalcy, then a pulse is transmitted to the sequence counter. If, at the following word, the correct bit combination reappears, the sequence counter is reset to zero.

The stopping of sequence counter 94 is therefore continued only if each of the words in the sequence represents an anomaly. In this case, upon the arrival at the receiver of a number of words corresponding to the number of sequences selected by the switch 95, e.g. 16 or 32, the sequence counter 94 transmits an enabling pulse through its output 97 to the previously inhibited reader 76.

Since the register stages of the device 99 contain the information of their corresponding digits at every moment, the emission of an enabling pulse by the sequence counter 94 in the presence of a consent signal on the output lead 69 of the end-of-word checking register 69 activates the stage or stages corresponding to the abnormal bit or bits to light corresponding indicator lamps 103, and possibly to trigger an audible warning device 104, so as to give the alarm.

According to the indicator lamp bit, the operator at the monitoring station knows which of the sensors of the transmitting station have been excited and can thus take appropriate action.

An input 105 and manual switches 107, 108 allow the extinction of the indicator lamps and possibly the termination of the audible warning.

The intervention of the sequence counter 94 renders it impossible for an alarm to be set off as a result of noise transmitted over the telephone line.

An attempt to analyze a word on the transmission line at the central station, even by means of an oscilloscope, is practically impossible: the repetitions cannot be perceived, inasmuch as the frequency of the oscillations transmitted is sufficiently low so that it would be necessary to reduce the sweep speed of an intercepting oscilloscope to a level which would prevent the display, on the oscilloscope screen, of a sufficient number of data merging into a continuous trace by virtue of the phenomenon of retinal persistence.

Figure 12:
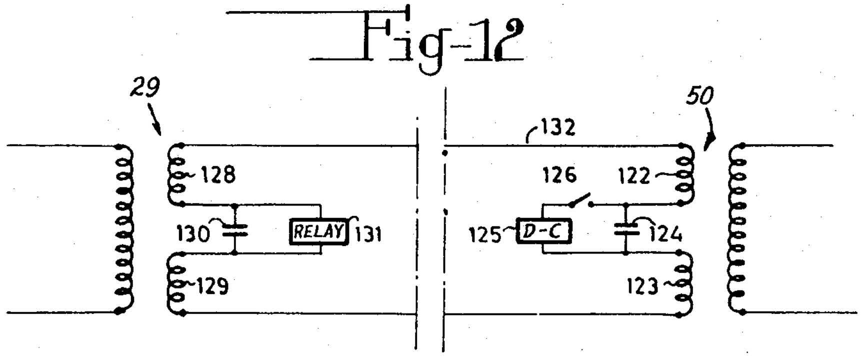
FIG. 12 is a diagram of a checking circuit for a d-c transmission line.

FIG. 12 shows the primary winding of the input transformer 50 at the receiving station as being divided into two winding portions 122 and 123, between which there is interposed a capacitor 124; a source of direct current 125 is connectable across the line between the two winding portions by closing a switch 126.

The primary winding of the output transformer 29 at the transmitting station likewise comprises two winding portions 128 and 129 between which there is interposed a capacitor 130 connected across the line in parallel with a relay 131.

Thus, by closing the switch 126, it is possible to obtain information regarding the continuity of the line 132 linking the transformers 29 and 50.

The closing of the switch 126 could also initiate an action to which one of the sensors on the surveyed premises is responsive, thus enabling the satisfactory operation of the installation to be checked at the receiving station.

I claim:

1. A system for the surveillance of protected premises from a remote monitoring office, comprising:
   a transmitting station on said premises;
   a receiving station at said monitoring office;
   a communication channel linking said transmitting station with said receiving station;
   sensing means on said premises having a normal output in the absence of a disturbance and an abnormal output in the presence of same;
   sequencing means at said transmitting station connected to said sensing means for forming the output thereof into a recurrent binary word to be transmitted over said channel, said word having bits indicating the normalcy of the output of said sensing means;
   register means at said receiving station connected to evaluate the bits of each incoming word arriving over said channel; and
   alarm means controlled by said register means for actuation upon a departure of an arriving word from a predetermined bit combination.

2. A system as defined in claim 1 wherein said sensing means comprises a plurality of sensors responsive to different types of disturbances, said sequencing means being controlled by said sensors for deriving respective bits of said binary word from individual outputs of said sensors, said alarm means including a plurality of indicators each responsive to a deviation of a respective bit in said arriving word from a prescribed value.

3. A system as defined in claim 2, further comprising coding means at said transmitting station connected to receive said binary word from said sequencing means for converting same into a predetermined series of modified words, said receiving station being provided with complementary decoding means for reconverting said modified words into said binary word prior to delivery thereof to said register means.

4. A system as defined in claim 3 wherein said transmitting station includes bit-generating means for adding invariable bits to said binary word, certain of the added bits having unity value, said receiving station being provided with checking means responsive to the absence of an added bit of unity value for actuating said alarm means.

5. A system as defined in claim 4 wherein said bit-generating means is connected to bypass said coding means in feeding said added bits to said channel, said checking means being connected to said channel ahead of said decoding means.

6. A system as defined in claim 4 wherein said transmitting and receiving stations are provided with synchronized sources of clock pulses and with respective pulse-counting means connected thereto for controlling the timing of the bits in respective clock cycles.

7. A system as defined in claim 6 wherein said pulse-counting means at said transmission station is connected to control said bit-generating means for adding a bit of unity value in each of the last two bit positions of a word, said checking means being controlled by said pulse-counting means at said receiving station to ascertain the presence of pulses in both said last two bit positions.

8. A system as defined in claim 6 wherein said checking means comprises an integrating circuit and a threshold detector in tandem with said integrating circuit.

9. A system as defined in claim 3 wherein said coding means comprises a binary adder and a shift register connected in a feedback loop of said adder for returning a shifted version of a word from the adder output to the adder input.

10. A system as defined in claim 9 wherein said feedback loop includes switch means for selecting different outputs of said shift register for return to the adder input.

11. A system as defined in claim 2, further comprising a word counter at said receiving station connected to be stepped by said register means upon a departure from said predetermined bit combination and to be reset in the absence of such departure, said alarm means being provided with inhibiting means effective in the absence of an enabling pulse emitted by said word counter after a predetermined number of consecutive words with deviating bits, said word counter being provided with resetting means operable by said register means in the absence of said departure.

12. A system as defined in claim 11 wherein said word counter is provided with switch means for selecting different values for said predetermined number of consecutive words.

13. A system as defined in claim 1 wherein said transmitting station includes a source of carrier wave and means for modulating said carrier wave with the bits of said binary word, said receiving station being provided with means for demodulating said carrier wave to reconstitute said binary word, said carrier wave having a frequency on the order of ten times the cadence of said bits.

14. A system as defined in claim 1 wherein said channel comprises a telephone line adapted for the transmission of direct current, further comprising test means connected across said line at one of said stations and a source of direct current connectable across said line at the other of said stations for ascertaining the continuity of the line.

* * * * *